United States Patent
Hill et al.

(10) Patent No.: US 8,351,095 B2
(45) Date of Patent: Jan. 8, 2013

(54) IMAGE SCAN DEVICE

(75) Inventors: Edward A Hill, Oceanside, CA (US);
Kevin Bokelman, San Diego, CA (US);
Glenn W Gaarder, Ramona, CA (US);
Ryan Smith, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 12/727,021

(22) Filed: Mar. 18, 2010

(65) Prior Publication Data
US 2011/0228356 A1    Sep. 22, 2011

(51) Int. Cl.
*H04N 1/04* (2006.01)
*G06K 7/00* (2006.01)
*H02K 41/00* (2006.01)

(52) U.S. Cl. ............ 358/488; 358/474; 235/439; 310/14
(58) Field of Classification Search .................. 358/488, 358/474; 235/439; 310/14
See application file for complete search history.

(56) References Cited

U.S. PATENT DOCUMENTS

| | | | |
|---|---|---|---|
| 3,274,944 A | 9/1966 | Parsons | |
| 4,631,432 A * | 12/1986 | Thaler | 310/14 |
| 4,991,030 A | 2/1991 | Sato et al. | |
| 5,227,846 A | 7/1993 | Leonard et al. | |
| 5,392,100 A | 2/1995 | Yoshida | |
| 7,554,701 B2 | 6/2009 | Hong et al. | |
| 2004/0207887 A1 | 10/2004 | Makino et al. | |
| 2005/0094221 A1 | 5/2005 | Lin | |
| 2007/0002397 A1 | 1/2007 | Osakabe | |
| 2010/0085612 A1* | 4/2010 | Audeon et al. | 358/474 |

\* cited by examiner

*Primary Examiner* — Charlotte M Baker
*Assistant Examiner* — Rury Grisham

(57) ABSTRACT

Image scan device, comprising a platen, and a carriage, the carriage comprising a scan head, and a support structure arranged to move the scan head with respect to the platen, wherein a resilient element is provided that is arranged to bias the scan head in the direction of the platen, and resilient element fully extends between the platen and the bottom of the carriage, as seen from a direction parallel to the platen.

16 Claims, 4 Drawing Sheets

IMAGE SCAN DEVICE

BACKGROUND OF THE INVENTION

In image scan devices, such as contact image sensor (CIS) image scan devices, typically, a scan head is moved along a platen by an automatic drive system to scan an image of a flat object that is supported by the platen. The CIS needs to maintain a close and constant scanning distance with respect to the object to be able to make a scan of relative quality. The scan device has a cover that presses the document against the platen when closed. The scan head is biased against the platen while moving along the platen to maintain the constant distance with respect to the platen. Typically, a compression bias spring is used to bias the scan head against the platen. The compression spring is biased against the bottom of the scan head, between the carriage and the scan head, to push the scan head against the platen. The scan head has wheels that engage the platen and guide the CIS at a constant small distance along the platen.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description through modification, combination or variation of certain elements. Furthermore, it may be understood that also embodiments or elements that may not be specifically disclosed in this disclosure may be derived from the description and drawings.

Figure 1:
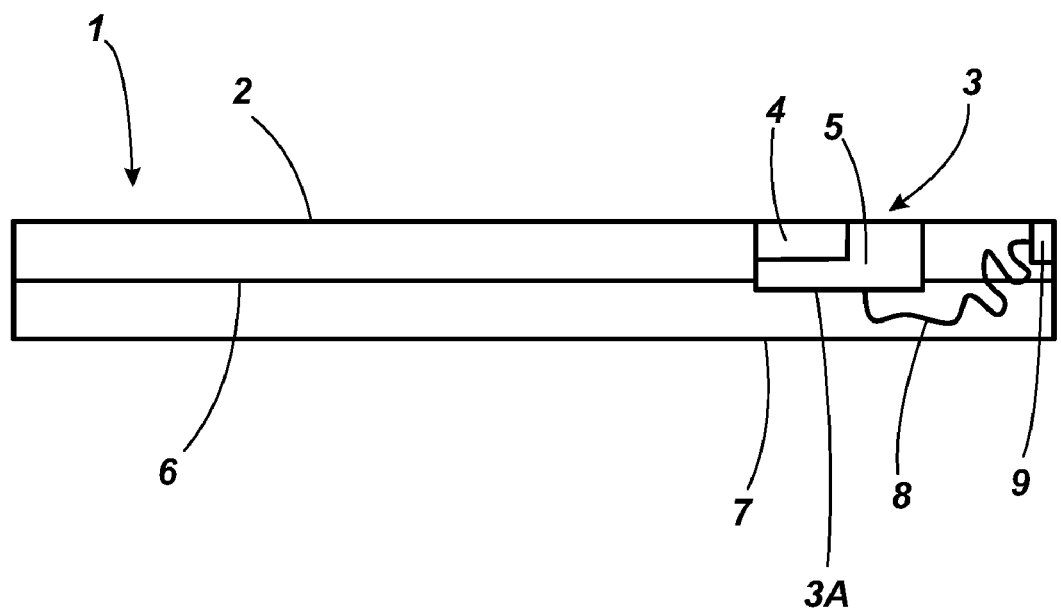
FIG. 1 shows a diagram of an embodiment of an image scan device in a cross-sectional side view.

FIG. 1 shows an image scan device 1. The image scan device 1 may be provided with a platen 2 for supporting documents or objects to be scanned. The image scan device 1 may comprise a carriage 3, arranged to move along the platen 2. The carriage 3 may comprise a scan head 4 for scanning an image of a document or object that is placed on the platen 2. The carriage 3 may further comprise a support structure 5, arranged to support the scan head 4 and to move the scan head 4 with respect to the platen 2.

For example, the image scan device 1 may comprise a flat bed scanner.

The scan head 4 may comprise an image sensor arranged along a substantial part of the length of the scan head 4, and/or a substantial part of the width of the platen 2. The image sensor may comprise a CIS (contact image sensor) and/or include a CMOS, CCD image sensor. Furthermore a telecentric array, reflective optics, and/or optical reduction elements may be applied together with the respective sensor. A cover (not shown) may be provided for preventing light to enter through the platen 2 onto the image sensor while scanning. The image scan device 1 may be a standalone device arranged to be connected to a further device such as a computer or printer adapted to exchange data to and from the scanner. In another embodiment, the image scan device 1 may be embedded into a system such as a computer or image processing device such as a printer, multifunction printer, copy machine, etc.

The support structure 5 may be arranged to have a substantially constant height with respect to the platen 2 and/or a housing 7 of the image scan device 1 while moving along the platen 2. A guide 6 may be provided for guiding the carriage 3 along the platen 2 while the support structure maintains a constant height within the housing 7.

Figure 2:
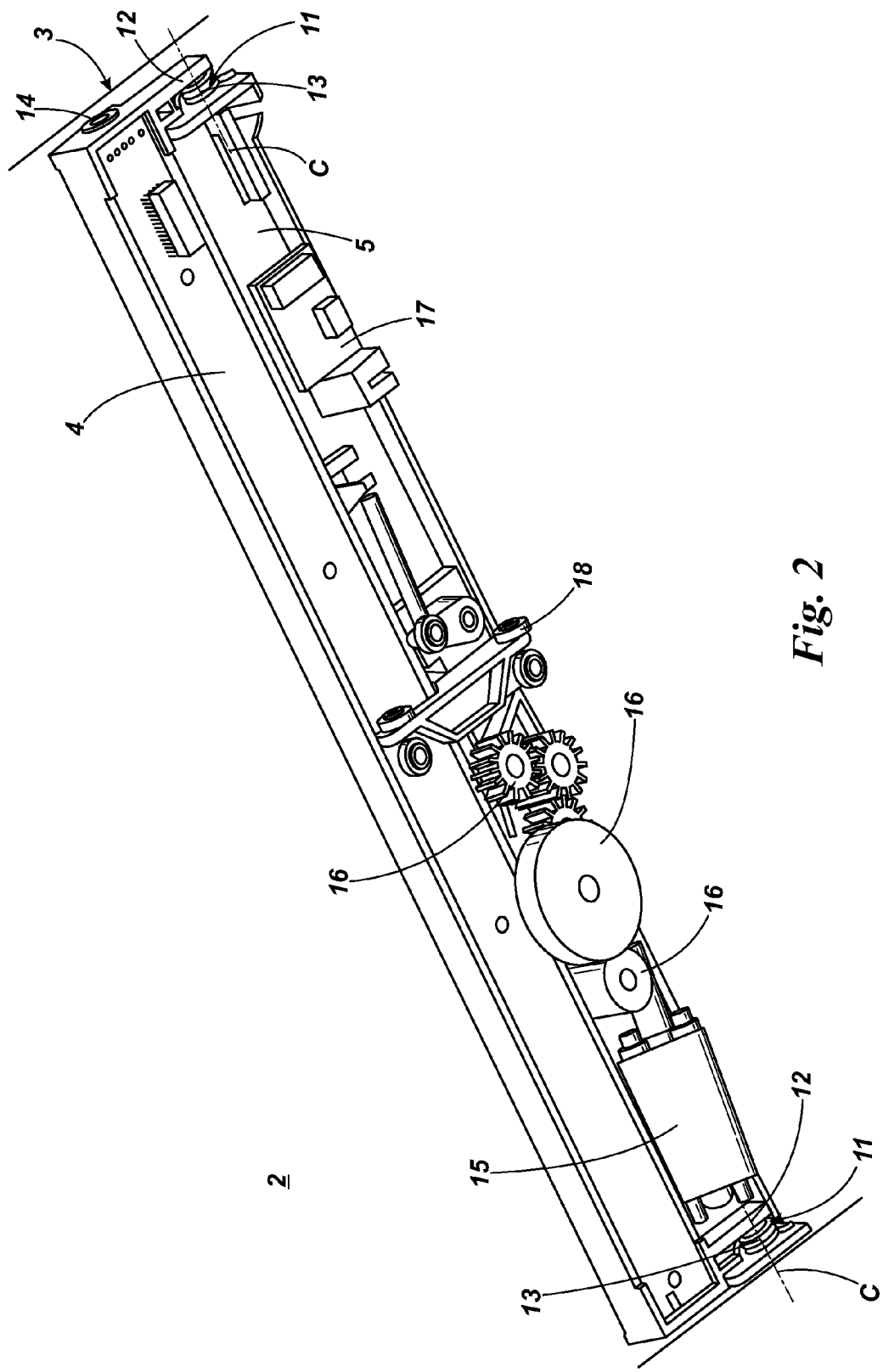
FIG. 2 shows a schematic perspective view of a carriage and a platen of an embodiment of an image scan device.

A drive system 10 may be provided for driving the carriage 3 along the guide 6. As shown in FIG. 2, a drive motor 10 may be provided in the support structure 5, for moving the support structure 5 along a guide 6 that is fixedly connected with respect to the housing 7. In addition, or alternatively, a drive system 10 may be fixedly connected with respect to the housing 7 for moving the guide 6, for example a moving belt or the like, and the support structure 5. The drive system 10 may comprise a rack and pinion system, as shown in FIG. 2. In another embodiment, the drive system 10 comprises a drive belt system. Other drive systems may also be suitable. A drive circuit may be provided to activate and control the drive system 10 in accordance with received instructions, for example from a processing circuit of a computer, copying, machine, multifunction printer, etc.

The image scan device 1 may comprise an interface connector, such as a flexible cable, for providing power to the scan head 4 and providing and receiving signals to and from the scan head 4 in any position of the scan head 4 relative to a power connection and/or data exchange interface 9. The interface connector 8 may provide power to the drive system elements that are provided in the carriage 3. A power connection and/or data exchange interface 9 may be provided for receiving and sending signals between a processing circuit and the scan head 4. In addition to, or instead of, the flexible cable also other signal communication means may be provided for power and/or data exchange to and from the carriage 3, such as printed traces, wireless communication means, etc.

FIG. 2 shows a simplified, perspective view of the bottom 3A of the carriage 3. The scan head 4 may be connected to the support structure 5 at the sides of the scan head 4 and the support structure 5. The scan head 4 may be arranged to hinge with respect to the support structure 5. The scan head 4 may be connected to the support structure 5 through hinges 11. The scan head 4 may comprise flanges 12 extending along the sides of the support structure 5. The hinges 11 may be connected to the flanges 12 and to the sides of the support structure 5. Around the hinges 11 resilient elements 13 may be arranged that bias the scan head 4 in the direction of the platen 2. The resilient element 13 may comprise a helical torsion spring. The resilient element 13 may comprise a coil spring, wound around its central axis C and/or a hinge axis of the respective hinge 11. The central axis C of the resilient element 13 (FIG. 4) may extend parallel to the platen 2. The central axis C of the resilient element 13 may be equal or approximately the same as the hinge axis of the hinges 11. The resilient element 13 may be arranged to exert a torque about the central axis C.

The scan head 4 may comprise guiding elements 14 such as wheels for sliding the scan head 4 over the platen 2 while it is being pressed against the platen 2 by the resilient element 13.

Instead or in addition to wheels, the guiding elements 14 may comprise slide elements or other suitable guiding elements.

The drive system 10 may comprise an electrometer 15, and one or more transmission elements such as gears 16, for example for a rack and pinion type drive system. The guide 6 may comprise a rack and the gears 16 may comprise pinions 16 corresponding to the rack 6. The motor 15 and transmission elements may be attached to the support structure 5. The support structure 5 may have a constant height with respect to the guide 6 when driven along the guide 6. The scan head 4 may be biased against the platen 2, so that in case of any irregularities in the height between the support structure 5 and the platen 2, e.g. due to tolerances in the guide 6, gears 16, or other elements, the scan head 4 may be pushed against the platen 2 by the resilient element 13.

The scan head 4 and/or the support structure 5 may be provided with a circuit 17 or the like for exchanging signals with a further processing circuit for processing and storing the scanned images. The circuit 17 or the like may be connected to the interface connector 8. The circuit 17 may comprise a drive circuit for the drive system, a image processing circuit communicating with the image sensor, or any other suitable circuit.

Figure 3:
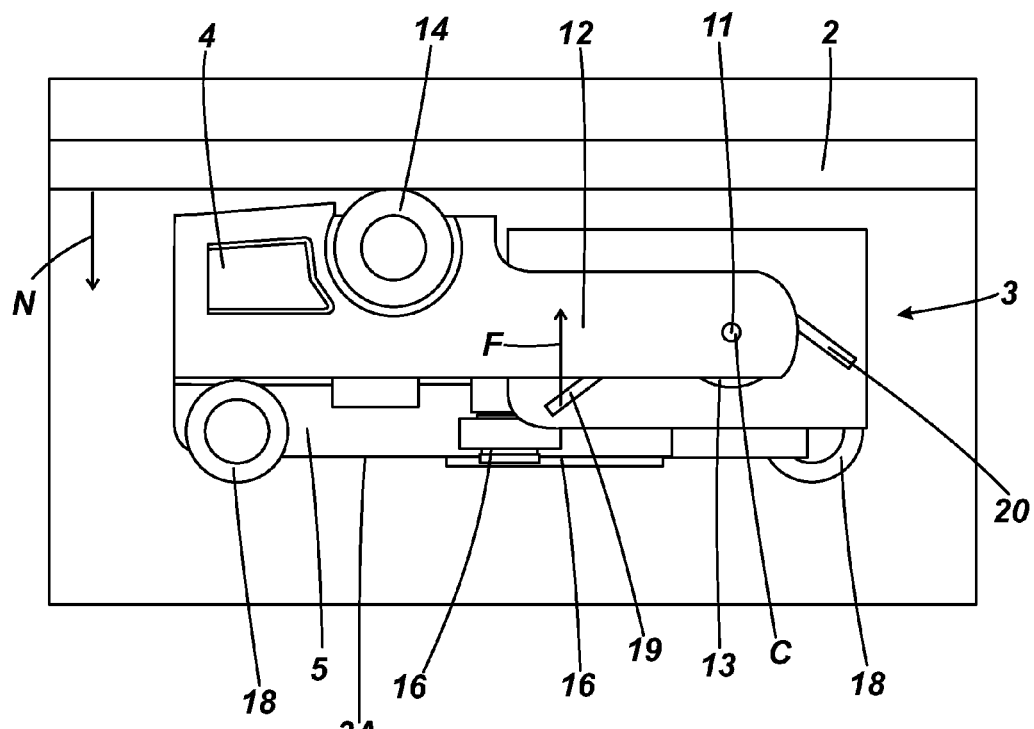
FIG. 3 shows a schematic side view of a carriage and a platen of the embodiment of the image scan device of FIG. 2.

FIG. 3 shows a side view of the carriage 3 and the platen 2. As can be seen, the scan head 4 is biased against the platen 2 by means of the resilient element 13. The guiding elements 14 are pushed against the platen 2. The support structure 14 may comprise second guiding elements 18, for example for rolling the support structure over a part of the housing 7 of the image scan device 1.

The resilient element 13 may extend near at least one of the sides of the scan head 4 and the support structure 5. A first end 19 of the resilient element 13 may engage the scan head 4. The scan head 4 may comprise a notch 21 for engaging said first end 19 (see FIG. 4). A second end 20 of the resilient element 13 may engage the support structure 5, which may be provided with a second corresponding notch 22. The resilient element 13 may be biased to exert a torque so as to rotate around the central axis C. Due to the torque, the first end 19 may have a force component F parallel to a normal vector N of the platen 2 in the direction of the platen 2. Due to the force component F, the resilient element 13 may push the scan head 4 in the direction of the platen 2, with the guiding elements 14 against the platen 2.

The resilient element 13 may extend between the platen 2 and the bottom 3A of the carriage 3, as seen from a direction parallel to the platen 2, as indicated by FIG. 3. The bottom 3A of the carriage 3 may be defined as the outer surface of the carriage 3 opposite to the platen 2. By adapting the carriage 3 and the resilient element 13 so that the resilient element 13 does not protrude out of the carriage 3 the total height of the carriage 3 may be relatively low. This may allow for a relatively flat image scan device 1.

The resilient element 13 comprises a coil spring, wound around a central axis C parallel to the platen 2. The spring may be arranged around the hinge 11 for exerting its torque in reaction to a pre-bending of its wire, hinging the scan head 4 with respect to the support structure 5 in the direction of the platen 2. For the same effect, a torsion bar may be applied that is arranged to exert a torque similar to the torque of the spring shown in the figures. Such torsion bar may be a solid torsion bar. The torsion bar may comprise elastomeric material. Alternatively, a leaf spring may be provided that is pre-tensioned to force to the scan head 4 against the platen 2. Such resilient element 13 may be arranged to extend between, and not outside, the platen 2 and the bottom 3A of the carriage 3.

The resilient element 13 may extend between the scan head 4 and the support structure 5, as seen from the direction of the normal vector N. The resilient element 13 may be arranged between the support structure 5 and the flange 12 of the scan head 4. In another embodiment, the support structure 5 may comprise a flange and the resilient element may be arranged between such flange and the scan head 4.

By having the torque force acting on the scan head 4 at a side of the scan head 4 the total height of the carriage 3, and hence the image scan device 1, may be limited. Applying a torsion spring may facilitate such placement at the side. In other, conventional biasing mechanisms, the spring exerts a force onto the scan head 4 along the central axis of the spring itself and is therefore logically placed under the scan head 4 to push the scan head 4 against the platen 2. This conventional biasing mechanism therefore has a higher carriage 3 and consequently provides for a higher image scan device 1.

Figure 4:
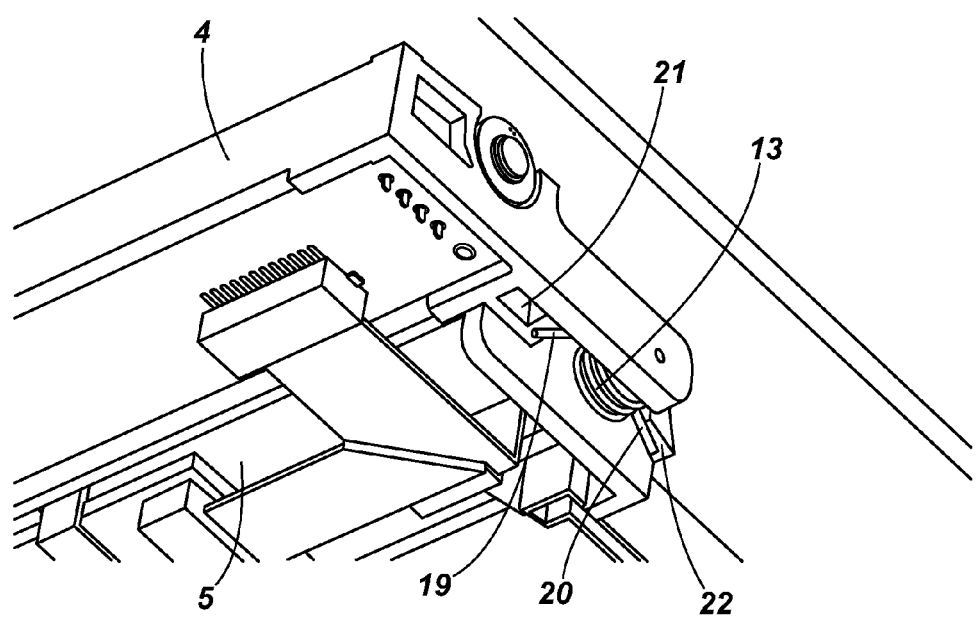
FIG. 4 shows a more detailed perspective view of the carriage and the platen of FIG. 2.

In FIG. 4 it is shown how the first end 19 of the resilient element 13 may engage a notch 21 of the scan head 4 and the second end 20 of the resilient element 13 may engage a notch 22 of the support structure 5. The notches 21, 22 may be provided near the sides of the scan head 4 and the support structure 5, respectively. The notch 21 of the scan head 4 may be provided on the flange 12. The resilient element 13 may be pre-tensioned so that both ends 19, 20 exert a force in opposite rotational directions, so that the scan head 4 hinges with respect to the support structure 5 in the direction of the platen 2. As already explained above, different types of resilient elements 13 may work according to this principle. For example the resilient element 13 may comprise a leaf spring, a helical torsion spring, a torsion bar, etc. Also, it is not required to use a hinge for moving the scan head 4 with respect to the support structure 5. For example, also a guide or an elastic member may be applied, instead of or in addition to a hinge 12, for movingly connecting the scan head 4 and the support structure 5 together.

Figure 5:
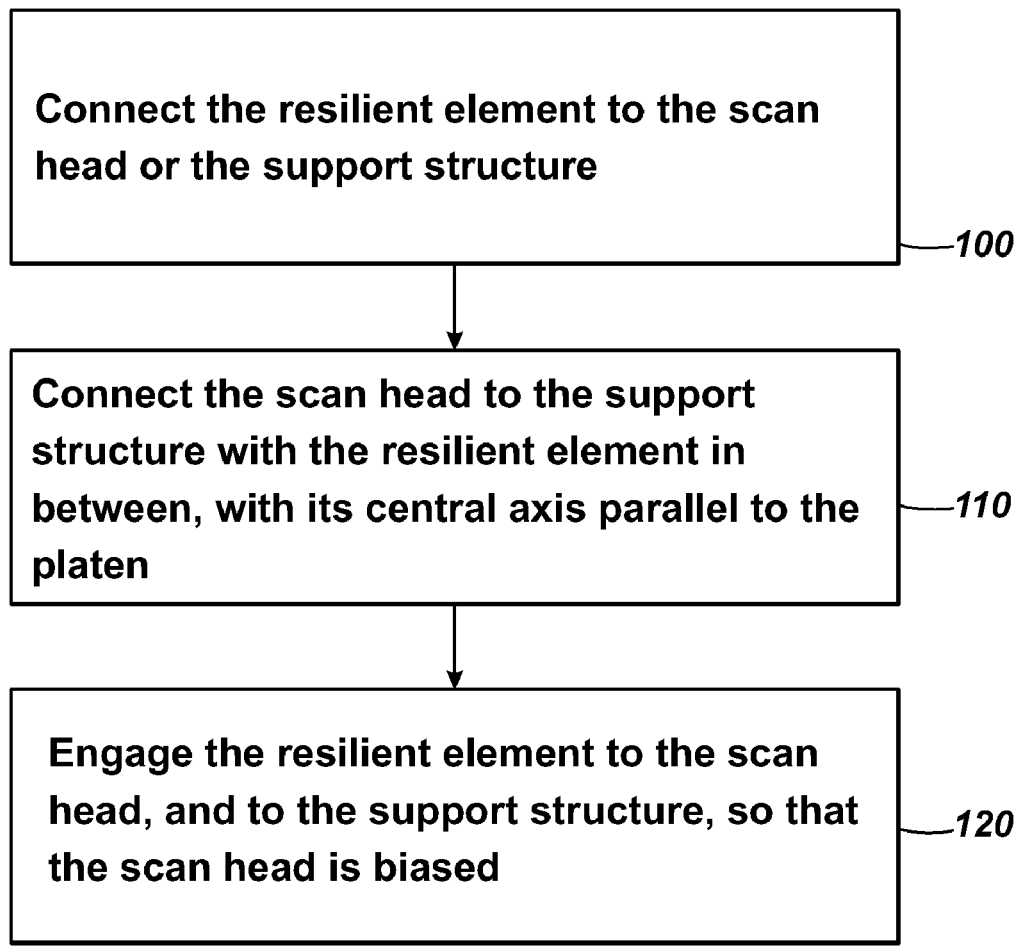
FIG. 5 shows an embodiment of a method of assembling a carriage for an image scan device.

In FIG. 5, a method of assembling the carriage 3 in the image scan device 1 is shown. In a step 100, the resilient element 13 may be connected between the scan head 4 and the support structure 5. As explained above, the resilient element 13 may be connected so as to extend between, and not outside of, the platen 2 and the bottom 3A of the carriage 3. The resilient element 13 may be connected near the side of the scan head 4 and/or the support structure 5. The resilient element 13 may be connected to and/or around a hinge 11 that connects the scan head 4 and the support structure 5.

The scan head 4 may be connected to the support structure 5 with the resilient element 13 in between, as indicated by step 110. The central axis C of the resilient element 13 may extend parallel to the platen 2. The resilient element 13 may be arranged so that it is biased. The resilient element 13 may be pre-tensioned, i.e. a torque may be applied to the resilient element 13, by engaging one end 19 of the resilient element 13 to the scan head 4 and another end 20 to the support structure 5. The scan head 4 may be biased away from the support structure 5, against the platen 2, as indicated by step 120. Furthermore, the method may involve connecting the support structure 5 to the guide 6.

In a first aspect, the image scan device 1 may be provided that may comprise a platen 2, and a carriage 3. The carriage 3 may comprise a scan head 4 and a support structure 5. The support structure may be arranged to move the scan head 4 with respect to the platen 2. A resilient element 13 may be provided that is arranged to bias the scan head 4 in the direction of the platen 2. The resilient element 13 may fully extend between the platen 2 and the bottom 3A of the carriage 3, as seen from a direction parallel to the platen 2 (e.g. see FIG. 3).

In a second aspect, an image scan device 1 may be provided that may comprise a housing 7, a platen 2, and a carriage 3. The carriage 3 may comprise a scan head 4. The carriage may be arranged to move the scan head 4 with respect to the platen 2 for scanning an image. The carriage 3 may further comprise a resilient torque element 13 arranged to exert a torque in reaction to an applied torque, and biased to press the scan head 4 in the direction of the platen 2. The resilient torque element 13 extends within the circumference of the carriage 3.

In a third aspect, a method of assembling a carriage 3 for an image scan device 1 may be provided. The method may comprise (i) connecting a resilient element 13 between a scan head 4 and a support structure 5 (100), so that the resilient element extends between, and not outside of, the platen and the bottom of the carriage, said bottom being the outer surface of the carriage opposite to the platen, and (ii) connecting the scan head to the support structure with the resilient element in between (110) so that the scan head is at least partly biased away from the support structure (120).

One, two or more resilient elements 13 may be applied to achieve the same effect. The resilient elements 13 may be arranged in any manner or any location with respect to the carriage 3, so that they do not extend outside of the bottom 3A of the carriage 3.

The image scan device 1 as disclosed herein allows for image scan devices 1 of reduced height with reduced cost and complexity. In this image scan device 1, it may be the height of the scan head 4 that determines the height of the image scan device 1. Also the image scan device 1 of this disclosure allows for multiple orientations of the scan head 4 and the platen 2, for example horizontal, vertical, upside down, or inclined orientations of the scan head 4 and the platen 2. Furthermore, application of the resilient element 13 allows for fabrication margins of the construction elements of the image scan device 1 while maintaining its precision.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

The mere fact that certain measures are recited in mutually different dependent claims does not indicate that a combination of these measures cannot be used to advantage. Multiple alternatives, equivalents, variations and combinations may be made without departing from the scope of the invention.

The invention claimed is:

1. Image scan device, comprising
a platen, and
a carriage, the carriage comprising
   a scan head,
   a support structure arranged to move the scan head with respect to the platen, and
   a resilient element coupled to the scan head and the support structure such that the element biases the scan head toward the platen, the resilient element fully extending between the platen and the bottom of the carriage as seen from a direction parallel to the platen.

2. Image scan device according to claim 1, wherein the resilient element extends near the side of the scan head or the support structure as seen in a direction of a normal vector of the platen.

3. Image scan device according to claim 1, wherein the resilient element extends between the support structure and the scan head as seen in a direction of a normal vector of the platen.

4. Image scan device according to claim 1, wherein the resilient element is arranged to exert a torque about a central axis of the resilient element, the central axis extending parallel to the platen.

5. Image scan device according to claim 4, wherein
one end of the resilient element engages the scan head,
another end of the resilient element engages the support structure, and
when under torque the ends are biased to rotate around the central axis of the resilient element, having a force component parallel to a normal vector of the platen, for pushing the scan head in the direction of the platen.

6. Image scan device according to claim 1, wherein
the resilient element comprises a helical torsion spring having a central axis parallel to the platen,
the scan head and the support structure are connected by a hinge having a hinging axis parallel to the platen, and
the spring is arranged around the hinge to exert a torque in reaction to a bending of its wire, engaging the scan head on one end and the support structure on the other, for hinging the scan head with respect to the support structure in the direction of the platen.

7. Image scan device according to claim 1, wherein
the scan head comprises at least one flange extending next to the support structure, as seen from a direction along a normal vector of the platen, and
the resilient element is arranged between said at least one flange and the support structure.

8. Image scan device, comprising
a platen, and
a carriage, the carriage comprising
   a scan head, and
   a support structure arranged to move the scan head with respect to the platen, wherein
a resilient element is provided that is arranged to bias the scan head in the direction of the platen, and resilient element fully extends between the platen and the bottom of the carriage, as seen from a direction parallel to the platen, wherein the scan head is arranged to hinge with respect to the support structure,
the support structure is arranged to have a constant height with respect to the platen while moving along the platen, and
the resilient element is arranged to push the scan head so as to hinge in the direction of the platen for keeping the scan head against the platen while moving along the platen.

9. Image scan device according to claim 1, comprising
a drive system,
a guide for guiding the carriage during movement, and
a drive circuit arranged to activate the drive system in accordance with received instructions.

10. Image scan device according to claim 1, wherein the scan head comprises a contact image sensor (CIS).

11. Image scan device, comprising
a housing,
a platen, a carriage, the carriage comprising a scan head, the carriage being arranged to move the scan head with respect to the platen for scanning an image, and a resilient torque element arranged to exert a torque in reaction to an applied torque, the torque element coupled to the scan head and the carriage such that the exerted torque urges the scan head away from the carriage toward of the platen, wherein the resilient torque element extends within the circumference of the carriage.

12. Image scan device according to claim 11, wherein the carriage comprises a support structure, the resilient torque element extends between the scan head and the support structure as seen in a direction of a normal vector of the platen.

13. Method of assembling a carriage for an image scan device, comprising connecting a resilient element between a scan head and a support structure, so that the resilient element extends between, and not outside of, the platen and the bottom of the carriage, said bottom being the outer surface of the carriage opposite to the platen, and connecting the scan head to the support structure with the resilient element in between so that the scan head is at least partly biased away from the support structure in a direction toward the platen by a force generated by the resilient element.

14. Method according to claim 13, comprising connecting the resilient element at the sides of the scan head.

15. Method according to claim 13, comprising arranging the resilient element around a hinge, connecting the scan head and the support structure by the hinge so that one end of the resilient element engages the scan head and another end engages the support structure for hinging the scan head with respect to the support structure, and connecting the support structure to a guide that is fixedly connected with respect to the image scan device housing.

16. Image scan device according to claim 11, wherein the resilient torque element is further arranged to force the scan head against the platen.

* * * * *

UNITED STATES PATENT AND TRADEMARK OFFICE
CERTIFICATE OF CORRECTION

| | |
|---|---|
| PATENT NO. | : 8,351,095 B2 |
| APPLICATION NO. | : 12/727021 |
| DATED | : January 8, 2013 |
| INVENTOR(S) | : Edward A Hill et al. |

It is certified that error appears in the above-identified patent and that said Letters Patent is hereby corrected as shown below:

In column 7, line 8, in Claim 11, after "toward" delete "of".

Signed and Sealed this
Ninth Day of April, 2013

Teresa Stanek Rea
*Acting Director of the United States Patent and Trademark Office*